(12) United States Patent
Deguchi

(10) Patent No.: US 7,572,042 B2
(45) Date of Patent: Aug. 11, 2009

(54) LEVELING DEVICE FOR VEHICULAR HEADLAMP

(75) Inventor: Hirohisa Deguchi, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 322 days.

(21) Appl. No.: 11/472,082

(22) Filed: Jun. 21, 2006

(65) Prior Publication Data

US 2006/0291231 A1 Dec. 28, 2006

(30) Foreign Application Priority Data

Jun. 27, 2005 (JP) .......................... P. 2005-186890

(51) Int. Cl.
*F21V 19/02* (2006.01)
*F21V 21/14* (2006.01)

(52) U.S. Cl. ...................... 362/523; 362/421; 362/428; 362/515; 362/528; 362/529

(58) Field of Classification Search ................. 362/421, 362/427–428, 514–515, 523–524, 528–529
See application file for complete search history.

(56) References Cited

U.S. PATENT DOCUMENTS 5,673,991 A * 10/1997 Eickhoff et al. ............. 362/513

6,428,196 B1 8/2002 Deguchi et al.
6,918,687 B2 7/2005 Deguchi

FOREIGN PATENT DOCUMENTS

| CN | 2499276 Y | 7/2002 |
|---|---|---|
| CN | 2698647 Y | 5/2005 |

* cited by examiner

*Primary Examiner*—Laura Tso
*Assistant Examiner*—Jason Moon Han
(74) *Attorney, Agent, or Firm*—Fish & Richardson P.C.

(57) ABSTRACT

A leveling device helps to prevent misalignment in the axial direction of an adjusting screw with respect to a shaft. A shaft 20 has an insertion cylindrical portion 21 that is in a generally cylindrical shape, and a shaft-side engagement portion 23 that is connected in the axial direction of the insertion cylindrical portion. An adjusting screw 27 has an insertion shaft portion 28 that mates with the insertion cylindrical portion of the shaft, and a screw-side engagement portion 31 that engages with the shaft-side engagement portion. The insertion shaft portion of the adjusting screw has an irregular portion 28a that is press-fit into the insertion cylindrical portion of the shaft, and that restricts movement in the axial direction with respect to the shaft.

5 Claims, 5 Drawing Sheets

LEVELING DEVICE FOR VEHICULAR HEADLAMP

The present disclosure relates to a leveling device for a vehicular headlamp. More specifically, the present disclosure relates to an irregular portion on an adjusting screw to prevent misalignment in the axial direction of the adjusting screw with respect to a shaft.

BACKGROUND

Vehicular headlamps with a leveling device are known for performing leveling adjustment to adjust an optical axis direction that changes due to the weight of objects loaded in a vehicle and a loading position (see, e.g., U.S. Pat. Nos. 6,428,196, 6,918,687).

The leveling device has respective predetermined portions disposed or supported in a case body, and includes: an adjusting screw that is connected to a tilt member such as a reflector whose illuminating angle of radiated light is changed by tilt movement; a shaft that supports the adjusting screw so as to be rotatable in a shafting direction and immobilized in an axial direction; a worm wheel that is rotatably supported by the case body and immobilized in the axial direction, as well as screwed to the shaft; and a motor that acts as a source of driving force to rotate the worm wheel.

In the foregoing leveling device, leveling adjustment is performed as follows. Driving force from the remote-controlled motor rotates the worm wheel, which sends the shaft screwed to the worm wheel in the axial direction. The adjusting screw supported by the shaft is fixed to the shaft and thus moved in the axial direction, tilting a tilt member such as the reflector, and changing the illuminating angle of radiated light.

In the foregoing leveling device, the shaft and the adjusting screw supported thereby are fixed together and moved in the axial direction to perform leveling adjustment. Therefore, means are used for restricting the movement of the adjusting screw in the axial direction with respect to the shaft.

An engagement projection portion is provided to restrict the movement of the adjusting screw with respect to the shaft. The engagement projection portion inwardly projects toward an end portion in the axial direction of the shaft, and an outwardly extending flange portion is on the adjusting screw which forms an engagement groove that engages with the engagement projection portion or a stepped portion for engagement. The engagement projection portion of the shaft and the engagement groove, or stepped portion for engagement, of the adjusting screw are engaged, and an opening edge on another end side of the shaft and the flange portion of the adjusting screw are engaged. Accordingly, movement in the axial direction of the adjusting screw with respect to the shaft is restricted.

According to the leveling device, engagement of the shaft and the adjusting screw is achieved by inserting the adjusting screw from the axial direction. In general, the shaft is formed from a resin material and configured such that a portion having the engagement projection portion elastically deforms.

In other words, as shown in FIG. 5, a portion of a shaft a having an engagement projection portion b is elastically deformed so as to deflect outward as a result of insertion of an adjusting screw c (a state indicated by dashed lines in FIG. 5). By positioning the engagement projection portion b corresponding to an engagement groove d of the adjusting screw c, the elastically deformed portion of the shaft a flexes back to normal such that the engagement projection portion b and the engagement groove d are engaged (a state indicated by solid lines in FIG. 5).

Dimensions of the engagement projection portion b and the engagement groove d are set taking into account a trajectory and tolerance of the engagement projection portion b when being inserted into the engagement groove d. In a state where the engagement projection portion b and the engagement groove d are engaged, a slight clearance D is created therebetween in the axial direction of the adjusting screw c. The clearance D is set within a range of 0.05 mm to 0.17 mm, for example.

Accordingly, the application of force in the axial direction to the adjusting screw c by external vibrations or the like may move the adjusting screw c with respect to the shaft a in the range of the clearance D, if the shaft a has little holding power with respect to the adjusting screw c. Consequently, a problem occurs in which the angle of a tilt member such as the reflector changes a corresponding amount, which then changes the illuminating angle of radiated light.

In addition, depending on the material of the shaft a and the adjusting screw c, as FIGS. 6 and 7 show, the adjusting screw c may expand greater than the shaft a at high temperatures. Consequently, a stepped portion of the engagement groove d may deform, pushing into the engagement projection portion b (see FIG. 6), and forming an indentation e on the engagement projection portion b (see FIG. 7) when the temperature returns to normal, thereby enlarging the clearance D.

If the clearance D is enlarged in such a manner, the amount of movement of the adjusting screw c with respect to the shaft a increases when force is applied in the axial direction to the adjusting screw c by external vibrations or the like. Accordingly, the change amount for the illuminating angle of radiated light also increases.

Hence, it is an object of a leveling device for a vehicular headlamp according to the present disclosure to resolve the foregoing problems and prevent misalignment of an adjusting screw in the axial direction with respect to a shaft.

SUMMARY

To resolve the foregoing problems, a leveling device for a vehicular headlamp according to the present disclosure describes: a shaft that has an insertion portion that is in a generally cylindrical shape, and a shaft-side engagement portion that is connected in the axial direction of the insertion cylindrical portion; and an adjusting screw that has an insertion shaft portion that mates with the insertion cylindrical portion of the shaft, and a screw-side engagement portion that engages with the shaft-side engagement portion. The insertion shaft portion of the adjusting screw has an irregular portion that is press-fit into the insertion cylindrical portion of the shaft, and that restricts movement in the axial direction with respect to the shaft.

Therefore, according to the leveling device for a vehicular headlamp in the present disclosure, the holding power of the shaft with respect to the adjusting screw is improved by press-fitting the irregular portion in the insertion cylindrical portion of the shaft.

A leveling device for a vehicular headlamp includes a case body, a motor disposed inside the case body, a shaft that moves in the longitudinal direction due to rotation of the motor, and an adjusting screw that is supported by the shaft when inserted thereto and rotatable in the shafting direction. The shaft has an insertion portion that is in a generally cylindrical shape, and a shaft-side engagement portion that is connected in the axial direction of the insertion cylindrical portion; and the adjusting screw has an insertion shaft portion that mates with the insertion cylindrical portion of the shaft, and a screw-side engagement portion that engages with the shaft-side engagement portion, wherein the insertion shaft portion of the adjusting screw has an irregular portion that is press-fit into the insertion cylindrical portion of the shaft, and that restricts movement in the axial direction with respect to the shaft.

Therefore, the adjusting screw does not move in the axial direction with respect to the shaft when external vibrations or the like occur, even if a clearance is created in the axial direction of the adjusting screw between the shaft-side engagement portion of the shaft and the screw-side engagement portion of the adjusting screw. Accordingly, unnecessary changes to the illuminating angle of the vehicular headlamp can be prevented.

In certain implementations, the shaft-side engagement portion has a convex shape, the screw-side engagement portion has a concave shape, and the irregular portion is formed on an entire circumference of a portion of the insertion shaft portion using, for example, a knurling tool. Therefore, the irregular portion can be simultaneously formed with the screw-side engagement portion of the adjusting screw. Accordingly, manufacture of the adjusting screw can be easily performed at low cost.

In certain implementations, a plurality of the irregular portions are at positions spaced in the axial direction of the insertion shaft portion. Therefore, it is possible to improve the holding power of the shaft with respect to the adjusting screw, and to reliably prevent movement in the axial direction of the adjusting screw with respect to the shaft.

Other features and advantages may be readily apparent from the following detailed description, the accompanying drawings, and the claims.

DESCRIPTION OF THE PREFERRED EMBODIMENT

Hereinafter, a best mode for carrying out a leveling device for a vehicular headlamp according to the present disclosure will be described with reference to accompanying drawings.

Figure 1:
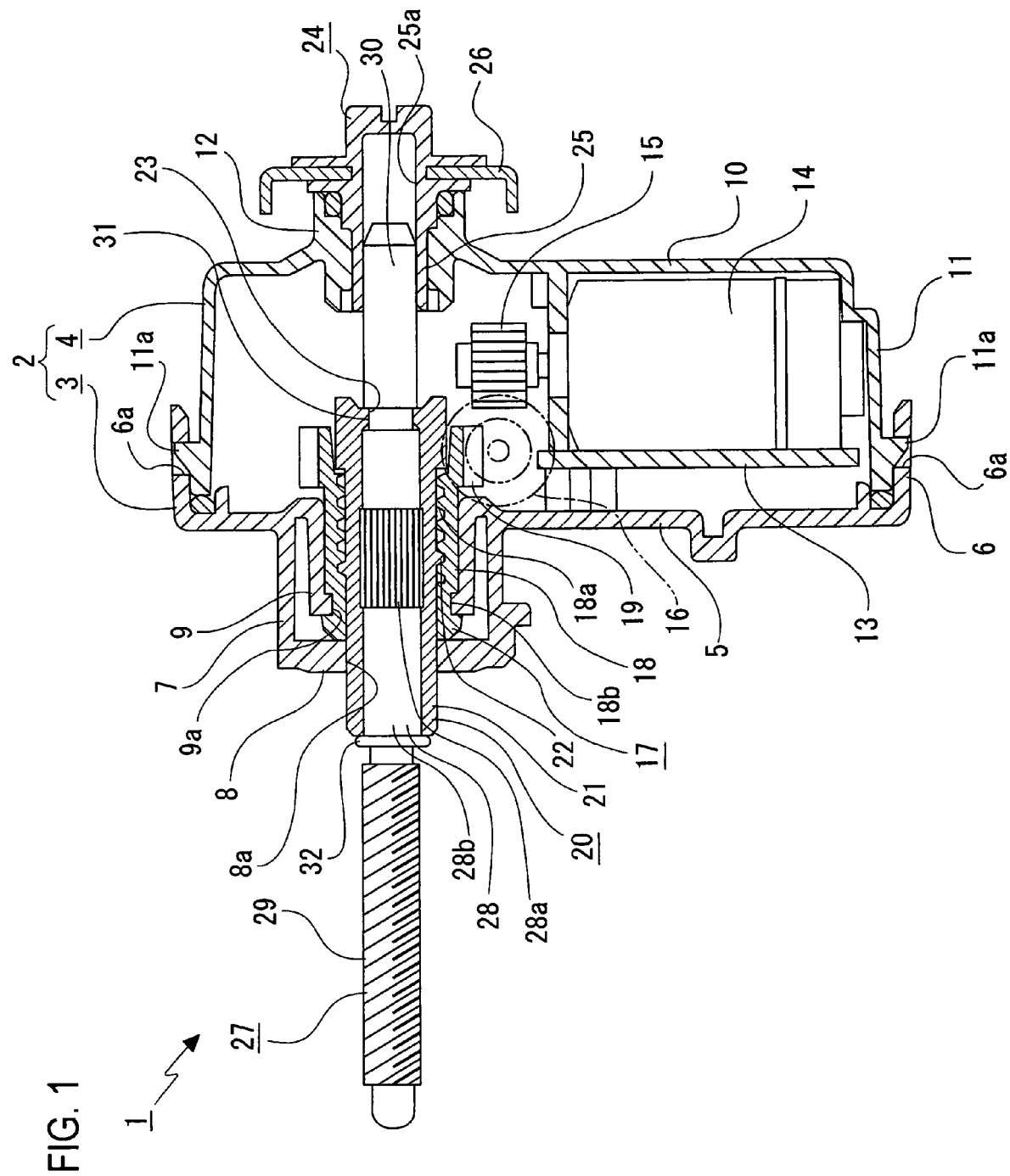
FIG. 1 is a vertical cross-sectional view of a leveling device for a vehicular headlamp.

FIG. 1. shows a leveling device 1 for a vehicular headlamp having a case body 2, with respective predetermined portions disposed or supported in the case body 2.

The case body 2 is formed by a front case 3 and a back case 4 that are longitudinally joined.

The front case 3 has a front surface portion 5 that is in a generally oblong shape, and a peripheral wall portion 6 that projects rearward from a peripheral edge of the front surface portion 5. Toward an upper end of the front surface portion 5 is a cylindrical projection portion 7 that projects forward and has a generally cylindrical shape.

The peripheral wall portion 6 is formed with multiple engagement holes 6a, 6a, . . . spaced in the circumferential direction.

An inner flange portion 8 that extends inward is on a front end portion of the cylindrical projection portion 7, and an inner side of the inner flange portion 8 has an inserting hole 8a. An inner-side cylindrical portion 9 is on an inner side of the cylindrical projection portion 7, slightly separated from the cylindrical projection portion 7. The inner-side cylindrical portion 9 extends forward from the front surface portion 5 up to a position somewhat rearward of a front end of the cylindrical projection portion 7. An engagement rib 9a that projects inward is on a distal end portion of the inner-side cylindrical portion 9.

The back case 4 has a rear surface portion 10 that is in a generally oblong shape, and a peripheral wall portion 11 that projects forward from a peripheral edge of the rear surface portion 10. A support portion 12 that extends in the longitudinal direction and has a generally cylindrical shape lies toward an upper end of the rear surface portion 10.

A front end portion of the peripheral wall portion 11 has multiple engagement pieces 11a, 11a, . . . spaced in the circumferential direction.

The case body 2 is configured by respective engagement of the engagement holes 6a, 6a, . . . on the peripheral wall portion 6 of the front case 3 with the engagement pieces 11a, 11a, . . . on the peripheral wall portion 11 of the back case 4.

The case body 2 is fixed to a lamp body of a vehicular headlamp (not shown) wherein the front surface portion 5 of the front case 3 contacts a rear surface of the lamp body.

Inside the case body 2, a printed board 13 and a motor 14 are disposed at a lower side thereof. A worm gear 15 is fixed to a motor shaft of the motor 14.

Inside the case body 2, a worm member 16 laterally extends and meshes with the worm gear 15 that is fixed to the motor shaft of the motor 14.

The front case 3 of the case body 2 rotatably supports a worm wheel 17. The worm wheel 17 is configured by integrally forming a cylindrical portion 18 that extends longitudinally and a wheel portion 19 that is on a rear end portion of the cylindrical portion 18.

An inner surface of the cylindrical portion 18 has a screw groove 18a. An engagement groove 18b that extends in a circular manner is on an outer surface of a distal end portion of the cylindrical portion 18.

Regarding the worm wheel 17, the cylindrical portion 18 is inserted from behind into the inner-side cylindrical portion 9 of the front case 3, and the engagement groove 18b of the cylindrical portion 18 slidably engages with the engagement rib 9a of the inner-side cylindrical portion 9. By slidably engaging the engagement groove 18b to the engagement rib 9a, the worm wheel 17 is rotatably supported by the front case 3 and immobilized in the longitudinal direction. The wheel portion 19 of the worm wheel 17 meshes with the worm member 16.

A shaft 20 is disposed on an inner side of the worm wheel 17. The shaft 20 is in a generally cylindrical shape long in the longitudinal direction, and is non-rotatable in a shafting direction due to rotation restricting means (not shown). The shaft 20 has an insertion cylindrical portion 21 that is longitudinally long, a screw projection 22 that is on an outer surface of the insertion cylindrical portion 21, and a shaft-side engagement portion 23 that projects inward from a rear end portion of the insertion cylindrical portion 21. The screw projection 22 is screwed to the screw groove 18 of the worm wheel 17.

Rotation of the worm wheel 17 due to the driving force of the motor 14 longitudinally turns the screw projection 22, thereby moving the shaft 20 in the longitudinal direction.

An adjusting gear body 24 is rotatably supported by the cylindrical support portion 12 of the back case 4. The adjusting gear body 24 is formed from a cylindrical portion 25 and a crown gear portion 26 that extends outward from the cylindrical portion 25. The cylindrical portion 25 is rotatably supported by the cylindrical support portion 12, and the crown gear portion 26 is positioned toward the rear of the back case 4. On the cylindrical portion 25 is a communication hole 25a that opens forward, and the communication hole 25a has a cross-sectional shape that is generally oval.

Figure 2:
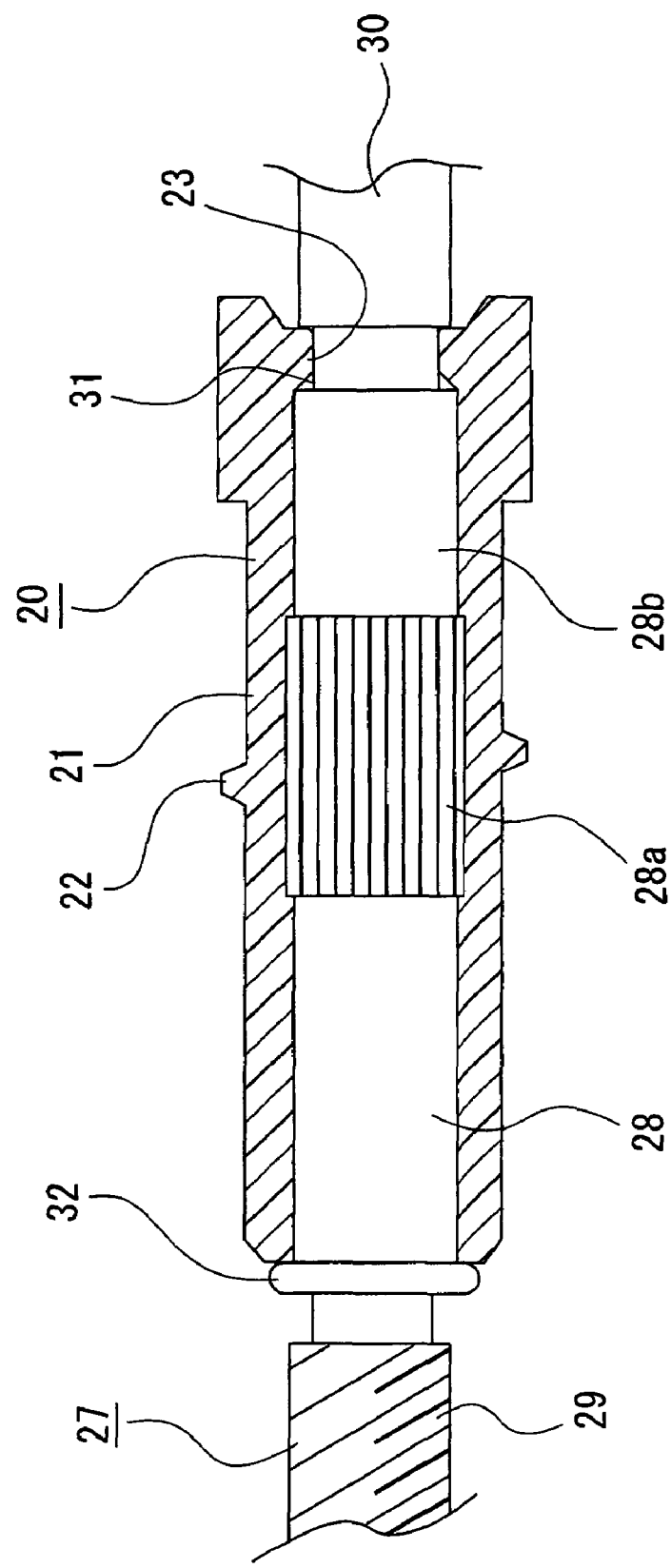
FIG. 2 is an enlarged side view of FIG. 1 showing a partial cross section of a state in which an adjusting screw is held to a shaft.

FIG. 2. shows an adjusting screw 27, held in a rotatable state on the shaft 20. The adjusting screw 27 is formed from an insertion shaft portion 28, a screw shaft portion 29 that projects forward from the insertion shaft portion 28, and a connecting portion 30 that projects rearward from the insertion shaft portion 28.

An irregular portion 28a is on the entire circumference of a portion of the insertion shaft portion 28 in the axial direction. The irregular portion 28a may be formed, for example, by so-called knurling processing using a knurling tool. A portion among the insertion shaft portion 28 not formed as the irregular portion 28a is a non-worked portion 28b, and a cross section of the non-worked 28b is a circular shape. The insertion shaft portion 28 also has a concave screw-side engagement portion 31 that extends in the circumferential direction toward the rear of the irregular portion 28a.

The adjusting screw 27 has a restriction flange portion 32 on a connecting portion of the insertion shaft portion 28 and the screw shaft portion 29.

The adjusting screw 27 is formed such that a distance from the screw-side engagement portion 31 to the restriction flange portion 32 is substantially identical to a distance from the shaft-side engagement portion 23 to the front end of the shaft 20.

Figure 3:
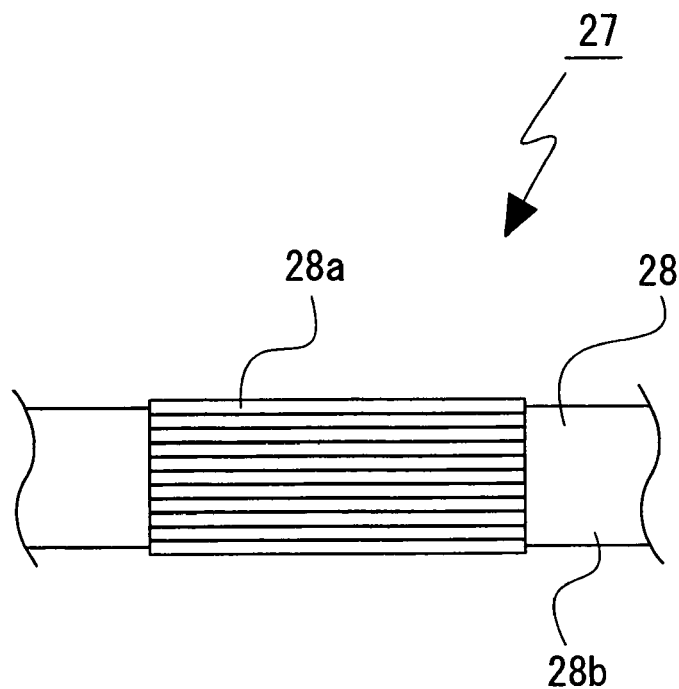
FIG. 3 is an enlarged side view of FIG. 1 showing a portion of the adjusting screw.

FIG. 3. shows an outer diameter of the insertion shaft portion 28 of the adjusting screw 27 substantially identical to or slightly larger than an inner diameter of the shaft 20, and an outermost diameter of the irregular portion 28a slightly larger than an outer diameter of the non-worked portion 28b. For example, the inner diameter of the shaft 20 may be 4.95 mm; the outermost diameter of the irregular portion 28a of the insertion shaft portion 28 may be 5.11 mm; and the outer diameter of the non-worked portion 28b of the insertion shaft portion 28 may be 5.00 mm.

The connecting portion 30 has a cross-sectional shape that is generally oval, similar to the communication hole 25a of the adjusting gear body 24.

The adjusting screw 27 is inserted into the shaft 20 such that the shaft-side engagement portion 23 of the shaft 20 engages with the screw-side engagement portion 31 of the adjusting screw 27, and the restriction flange portion 32 of the adjusting screw 27 engages with a front surface of the shaft 20 from a front side. The insertion shaft portion 28 of the adjusting screw 27 is thus press-fit into the insertion cylindrical portion 21 of the shaft 20.

The adjusting screw 27 is then connected such that the screw shaft portion 29, for example, screws into a nut body fixed to a reflector (not shown) that is a tilt member, and the connecting portion 30 is inserted into the communication hole 25a of the adjusting gear body 24. Accordingly, the adjusting screw 27 is non-rotatable in the shafting direction but movable in the axial direction with respect to the adjusting gear body 24, because the connecting portion 30 whose cross section is in a generally oval shape is inserted into the communication hole 25a that is in a similar generally oval shape. Therefore, when the adjusting gear body 24 is rotated, the adjusting screw 27 integral with the adjusting gear body 24 is rotated with respect to the shaft 20.

The leveling device 1 configured as described in the foregoing disclosure is fixed to a housing (not shown) of the vehicular headlamp, for example.

During aiming adjustment, for example, using the leveling device 1, a cross-head screwdriver is meshed with the crown gear portion 26 of the adjusting gear body 24 and turned. The adjusting gear body 24 is consequently rotated, and the adjusting screw 27 rotates in conjunction with the rotation of the adjusting gear body 24. Rotation of the adjusting screw 27 screws the screw shaft portion 29 into or out of the nut body. Consequently, a portion that supports the nut body of the reflector is moved in the longitudinal direction, tilting the reflector and changing the illuminating angle of the vehicular headlamp.

Meanwhile, the motor 14 is driven by remote control during leveling adjustment. Driving of the motor 14 results in rotation of the worm wheel 17 via the worm gear 15 fixed to the motor shaft and the worm member 16. The rotation of the worm wheel 17 sends the shaft 20 forward or rearward, and the adjusting screw 27 supported by the shaft 20 accordingly moves forward or rearward. Therefore, a portion that supports the nut body of the reflector is moved in the longitudinal direction, tilting the reflector and changing the illuminating angle of the vehicular headlamp.

In the leveling device 1, as described in the foregoing disclosure, the adjusting screw 27 is formed with the irregular portion 28a and press-fit into the shaft 20. Therefore, the adjusting screw 27 does not move in the axial direction with respect to the shaft 20 when external vibrations or the like occur, even if a clearance is created in the axial direction of the adjusting screw 27 between the shaft-side engagement portion 23 of the shaft 20 and the screw-side engagement portion 31 of the adjusting screw 27. Accordingly, unnecessary changes to the illuminating angle of the vehicular headlamp can be prevented.

In addition, as described in the foregoing disclosure, the irregular portion 28a can be formed simultaneously with the screw-side engagement portion 31 of the adjusting screw 27 by forming the screw-side engagement portion 31 into a concave shape, and forming the irregular portion 28a using, for example, a knurling tool. Accordingly, manufacture of the adjusting screw 27 can be easily performed at low cost.

Figure 4:
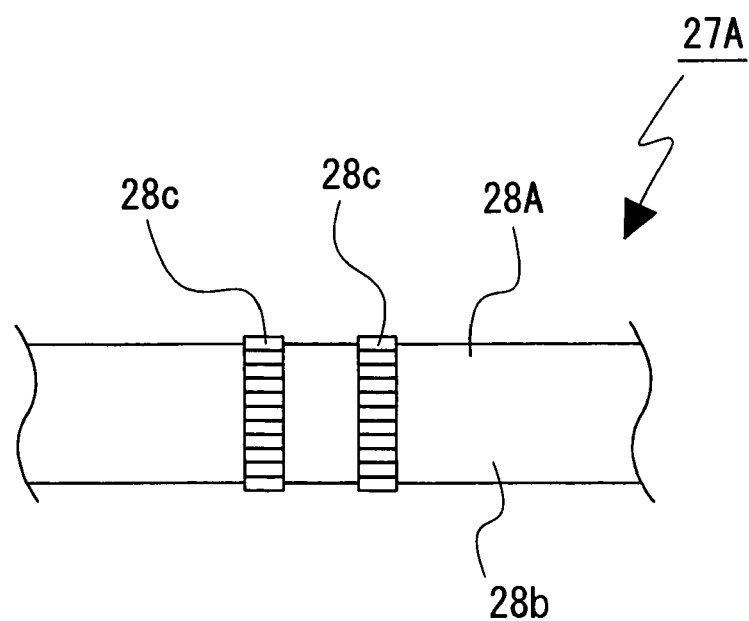
FIG. 4 is an enlarged side view of FIG. 1 showing a portion of the adjusting screw on which a plurality of irregular portions is formed.
Figure 5:
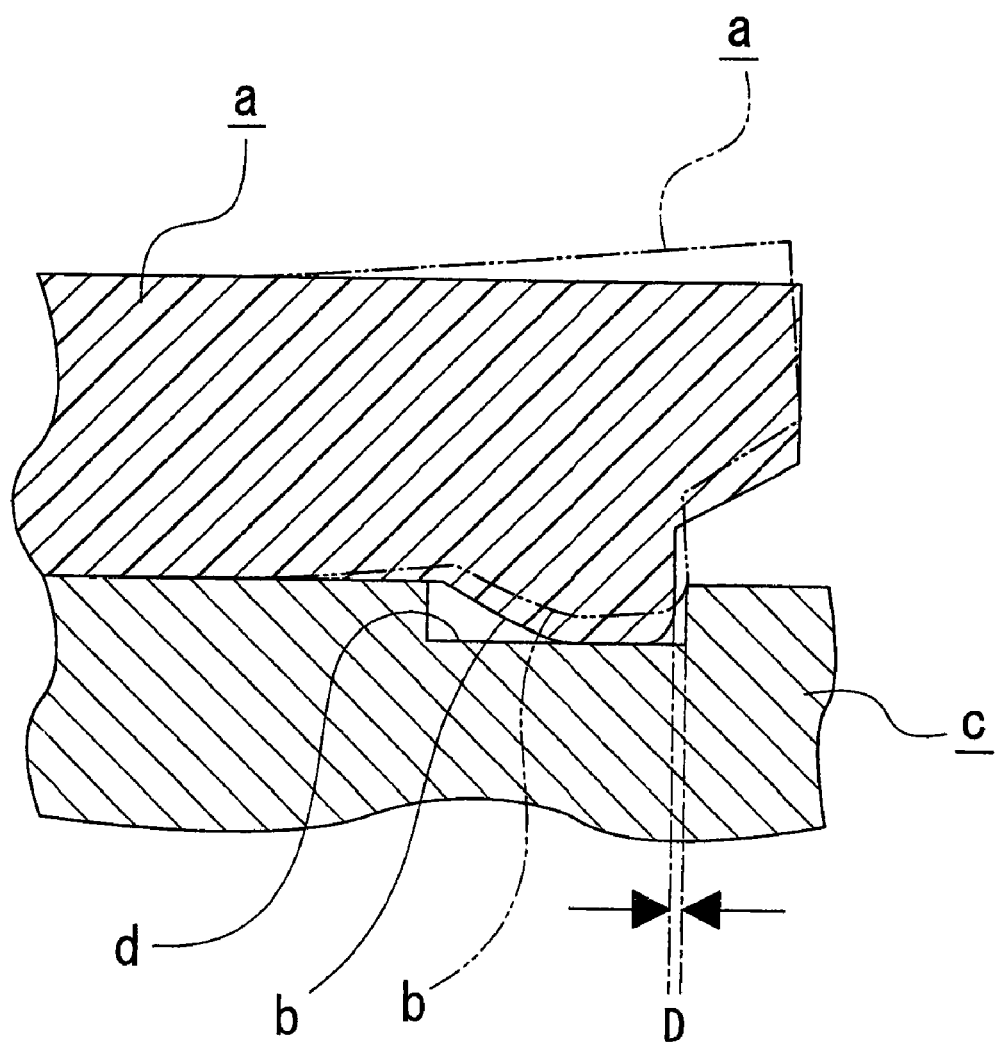
FIG. 5 illustrates problems with related art, as FIGS. 6 and 7 also illustrate, and is a conceptual diagram showing the relationship between the sizes of an engagement projection portion and an engagement groove portion.
Figure 6:
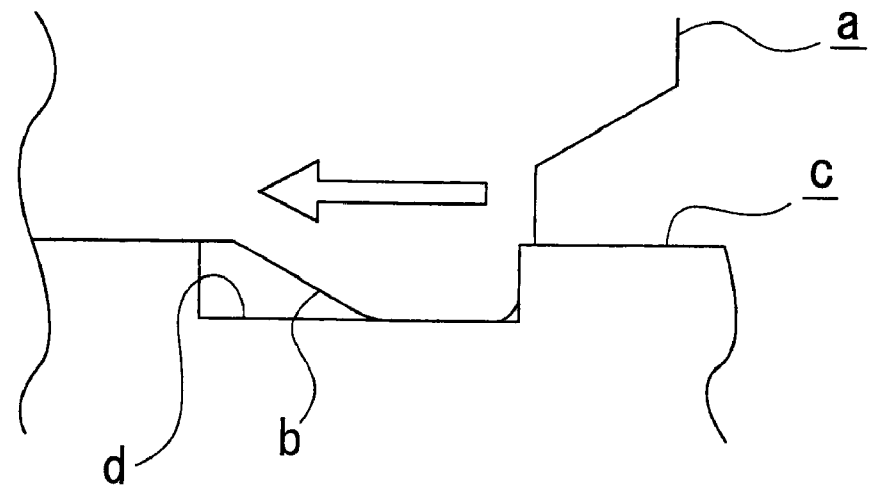
FIG. 6 is a conceptual diagram showing a state at high temperature.
Figure 7:
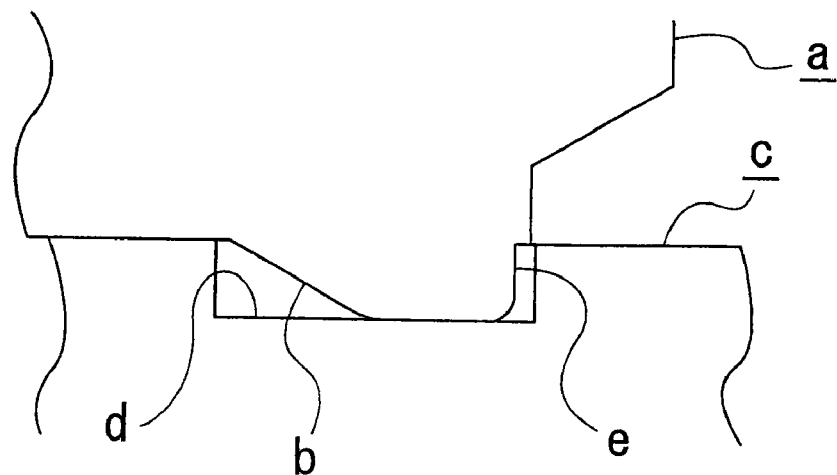
FIG. 7 is a conceptual diagram showing a state at which a high temperature has returned to normal temperature.

An adjusting screw 27 with one irregular portion 28a was given as an example in the foregoing description. However, as shown in FIG. 4, an adjusting screw 27A may be used instead of the adjusting screw 27, with multiple irregular portions 28c, 28c on an insertion shaft portion 28A, and movement in the axial direction of the adjusting screw 27A restricted with respect to the shaft 20. The irregular portions 28c, 28c may, for example, be spaced in the axial direction of the adjusting screw 27A, and a width of the irregular portions 28c, 28c in the axial direction of the adjusting screw 27A may be smaller than the irregular portion 28a.

Formation of such irregular portions 28c, 28c may be achieved as follows. First, one irregular portion with a large width is formed. A portion on this formed portion that will not become the irregular portions 28c, 28c is then processed and formed into a curved surface. Remaining portions subsequently act as the irregular portions 28c, 28c.

Using the adjusting screw 27A with multiple irregular portions 28c, 28c makes it possible to improve the holding power of the shaft 20 with respect to the adjusting screw 27A, and to reliably prevent movement in the axial direction of the adjusting screw 27A with respect to the shaft 20.

The number of irregular portions that may be on the adjusting screw is arbitrary. Although one or two irregular portions are discussed in the foregoing disclosure, for example, three or more irregular portions may be on the adjusting screw as well.

The shapes and structures of respective portions in the foregoing preferred embodiment are all examples for carrying out the present disclosure, and must not be construed as limiting the technical scope of the present disclosure in any manner.

Other implementations are within the scope of the claims.

What is claimed is:

1. A leveling device for a vehicular headlamp comprising:
   a case body for the headlamp,
   a motor disposed inside the case body,
   a shaft that is movable in a direction along a longitudinal axis of the shaft as a result of rotation of the motor, and
   an adjusting screw that is supported by the shaft when inserted, and rotatable in the shafting direction, wherein
   the shaft has an insertion cylindrical portion that is in a generally cylindrical shape, and a shaft-side engagement portion that is connected in the axial direction of the insertion cylindrical portion; and
   the adjusting screw has an insertion shaft portion that mates with the insertion cylindrical portion of the shaft, and a screw-side engagement portion that engages with the shaft-side engagement portion, wherein
   the insertion shaft portion of the adjusting screw has an irregular portion that is press-fit into the insertion cylindrical portion of the shaft, and that restricts movement in the axial direction with respect to the shaft.

2. The leveling device for a vehicular headlamp according to claim 1, wherein:
   the shaft-side engagement portion is in a convex shape,
   the screw-side engagement portion is in a concave shape, and
   the irregular portion is on an entire circumference of a portion of the insertion shaft portion.

3. The leveling device for a vehicular lamp according to claim 1, wherein:
   a plurality of irregular portions are at positions spaced in the axial direction of the insertion shaft portion.

4. The leveling device for a vehicular lamp according to claim 2, wherein:
   a plurality of irregular portions are at positions spaced in the axial direction of the insertion shaft portion.

5. The leveling device for a vehicular lamp according to claim 1, wherein the motor is coupled to a worm gear, the shaft is coupled to a worm wheel, and a worm member couples the worm gear and the worm wheel.

* * * * *